Figure 1:
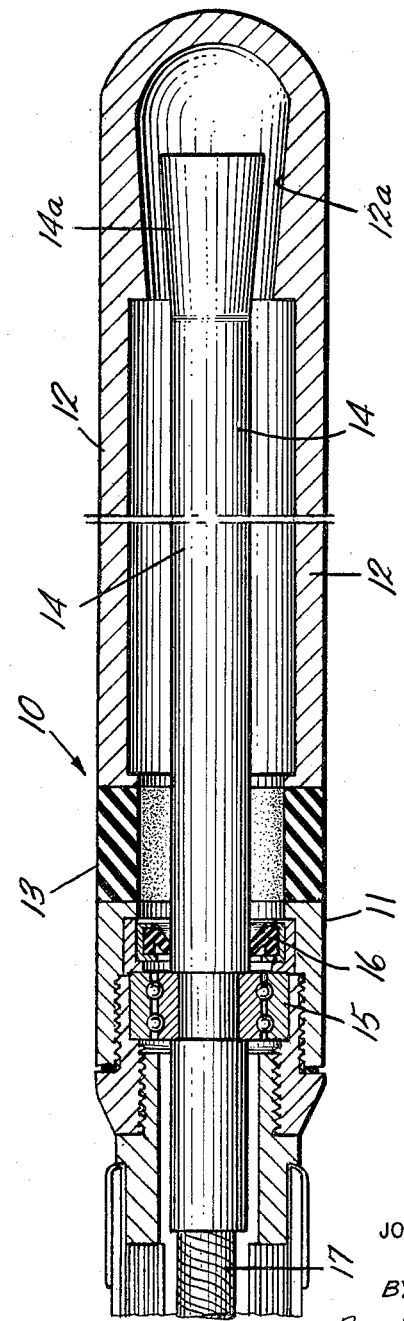

Oct. 13, 1964  J. G. S. SVENSSON  3,152,791
VIBRATOR

Filed June 12, 1962  2 Sheets-Sheet 1

INVENTOR.
JOHN GUSTAV SIXTEN SVENSSON
BY
Brumbaugh, Free, Graves & Donohue
his   ATTORNEYS.

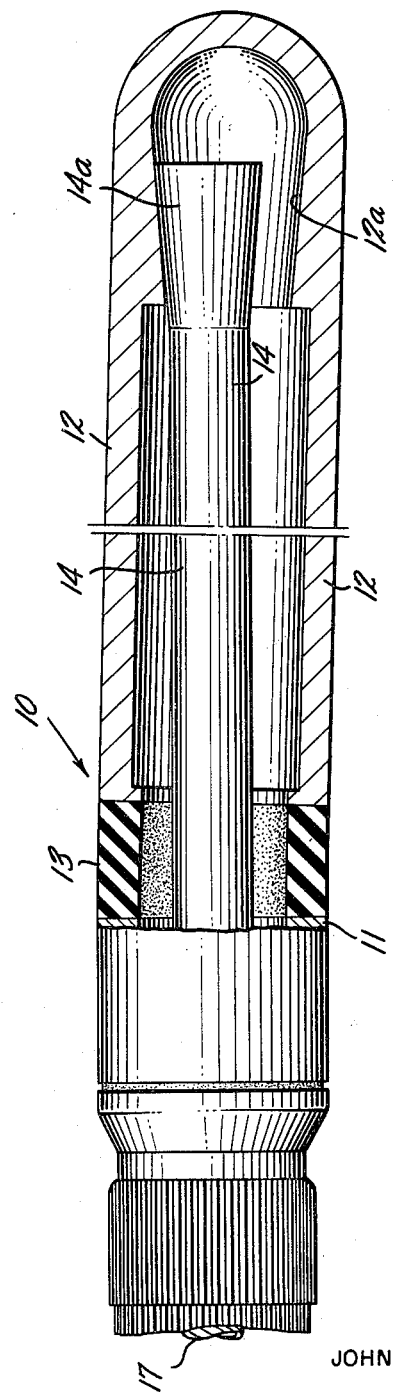

United States Patent Office 3,152,791
Patented Oct. 13, 1964

3,152,791
VIBRATOR
John Gustav Sixten Svensson, Bromma, Sweden, assignor to Aktiebolaget Vibro-Verken, Solna, Sweden, a corporation of Sweden
Filed June 12, 1962, Ser. No. 201,879
Claims priority, application Sweden June 14, 1961
3 Claims. (Cl. 259—1)

This invention relates to vibrators, and in particular, to high frequency vibrators of the type intended to be immersed in semi-fluid or viscous material to be vibrated such as concrete.

Vibrators of the immersion type ordinarily include a cylindrical casing containing an elongated rod rotatably journaled at one end. As the rod is rotated, its free end orbits with a planetary motion around the inside of the cylindrical casing to generate vibrations in accordance with the principles of conical pendulum motion. The ratio between the rolling surface diameter of the rod and the diameter of the casing where it contacts the rod can be selected o provide vibration frequencies substantially higher than the rotation frequency of the rod.

To enable the rolling rod to perform its planetary motion, the rod has been journaled in a movable bearing which permits the required angular deviation, for example a spherical bearing, or a flexible rod has sometimes been used. In the latter case, theoretical conical pendulum motion is somewhat altered.

With vibrators constructed in the foregoing manner, the angular deviation provided by the movable bearing as the rolling rod rotates has resulted in excessive wear on the bearing thus shortening its life. Further, it is difficult to prevent lubricant in the movable bearing from leaking into the inner portions of the casing, especially after the bearing has become worn. Lubricant seeping onto the surface along which the rod orbits reduces the coefficient of friction and prevents the rolling rod from performing the intended planetary rolling motion around the inside of the casing, thereby impairing the high frequency vibrations for which this type of vibrator is noted.

On the other hand, in vibrators in which rod deviation is absorbed by the rod itself, the rod is exposed to high centrifugal stress during rotation making it necessary to equip such rods with a supporting roller located between the bearing and the surface on which the rod rotates. The supporting roller limits rod bending during rotation as intended but also results in extensive and expensive complications in design and construction.

Accordingly, it is an object of the present invention to overcome the foregoing difficulties inherent in the prior rolling rod type vibrators while still taking advantage of conical pendulum motion.

It is a further object of the invention to provide conical pendulum motion in a vibrator by providing a resiliently flexible linking section joining parts of a cylindrical casing within which an elongated body rotates to cause angular motion of the outer portion of the casing rather than the body.

These and further objects of the invention are accomplished by providing between two parts of a vibrator casing, within which an elongated body is rotatably mounted, a resiliently flexible linking section. When the outer part of the cylindrical casing contacts the rotating body, it imparts to the casing a circular conical motion relative to the longitudinal axis of the rotating body. Of course, the casing cannot rotate, but the resultant relative motion of the two members is the same in this case as in the case of the conventional rolling rod type vibrator. Thus the free end of the rolling body orbits with a planetary motion relative to the cylindrical casing. As a result the vibration frequency is substantially higher than the rotation frequency of the body thus preserving an advantageous feature of rolling rod type vibrators.

An advantage of the invention is that the bearing journaling the rotating body does not provide angular deviation which permits the use of a fixed bearing with its better lubricant seal. Further, making the rotating body entirely rigid increases strength and simplifies construction of the vibrator.

These and further advantages of the invention will be more readily understood when the following description is read in connection with the accompanying drawing, in which:

FIGURE 1 illustrates a typical vibrator incorporating the principles of the present invention; and FIGURE 2 is a view of the vibrator of FIGURE 1 in operation.

The vibrator is formed by a casing 10 which includes two parts 11 and 12 joined by a flexible linking section 13. Preferably the linking section 13 comprises an elastic ring formed of rubber or similar material, although any resiliently flexible material may be used. The linking section is secured in a suitable manner to the casing parts 11 and 12.

An elongated rotatable body 14 extending through the casing 10 is journaled by a fixed bearing 15 in the casing part 11. An efficient seal 16 precludes the flow of lubricant from the bearing 15 into the interior of the casing part 12. A flexible shaft 17 attached to the body 14 rotates it at a selected speed. Any other appropriate drive mechanism may be used.

At the end of the rotatable body 14, shown in the form of a pin in the drawing although it may comprise a separate shaft and attached element, there is formed a rolling surface 14a adapted to cooperate with a rolling surface 12a on the interior of the casing part 12.

In operation, rotation of the shaft 14 and insertion of the casing 10 into a material to be vibrated results in a deviation of the casing part 12 from its normal alignment with the casing part 11 and engagement of the rolling surfaces 12a and 14a, as shown in FIGURE 2, to provide frictional rolling contact between the surfaces. This causes the casing part 12 to be acted upon by the rotating shaft 14 so that it moves with a circular conical motion relative to the longitudinal axis of the rotating shaft 14. Therefore, the vibrator operates in accordance with the principles of a conical pendulum and any desired ratio of diameters may be selected for the rolling surfaces 12a and 14a to provide an arbitrary increase in the ratio of vibration frequency to the rotation frequency of the drive shaft 17.

Since the casing part does not rotate, the stresses developed in the linking section 13 are relatively low and, in the circumstances, it is not necessary to use expensive elastic materials. The only requirement is that the linking section permits contact between the casing section 12 and the rotatable shaft 14 while maintaining sufficient rigidity to prevent excessive axial play in the movable portion 12 of the casing 10.

It will be understood that the above-described embodiment of the invention is illustrative only and modifications thereof will occur to those skilled in the art. Thus, while the linking section 13 is preferably located close to the bearing 15, as shown in the drawing, it may be located further along the casing 10 in a particular vibrator. Therefore, the invention is not to be limited to the specific apparatus disclosed herein but is to be defined by the appended claims.

I claim:
1. A vibrator comprising a rigid elongated rotatable body formed with a first rolling surface on one end thereof, an elongated casing formed in two parts carrying the elongated body; a resiliently flexible linking section joining the two casing parts, a fixed bearing in one of the casing parts rotatably supporting the rotatable body remote from the one end thereof, and a second rolling surface on the other casing part, the first rolling surface adapted to be in frictional rolling contact with the second rolling surface when the other casing part is displaced from its normal position into engagement with the rotatable body.

2. A vibrator as defined in claim 1, wherein the resiliently flexible linking section comprises an elastic ring.

3. A vibrator as defined in claim 2, wherein the elastic ring is located close to the bearing.

References Cited in the file of this patent

UNITED STATES PATENTS

| | | |
|---|---|---|
| 2,148,722 | Baily | Feb. 28, 1939 |
| 2,232,842 | Douglass | Feb. 25, 1941 |
| 2,546,806 | Wenander | Mar. 27, 1951 |
| 2,876,647 | Petrin | Mar. 10, 1959 |

FOREIGN PATENTS

| | | |
|---|---|---|
| 818,928 | Great Britain | Aug. 26, 1959 |